US007432931B2

(12) United States Patent
Someya et al.

(10) Patent No.: US 7,432,931 B2
(45) Date of Patent: Oct. 7, 2008

(54) APPARATUS AND METHOD FOR PROCESSING IMAGE SIGNAL AND IMAGE DISPLAY APPARATUS UTILIZING THE SAME

(75) Inventors: Ikuo Someya, Tokyo (JP); Koji Yamamura, Kanagawa (JP)

(73) Assignee: Sony Corporation (JP)

( * ) Notice: Subject to any disclaimer, the term of this patent is extended or adjusted under 35 U.S.C. 154(b) by 65 days.

(21) Appl. No.: 10/546,014

(22) PCT Filed: Feb. 17, 2004

(86) PCT No.: PCT/JP2004/001737

§ 371 (c)(1), (2), (4) Date: Apr. 3, 2006

(87) PCT Pub. No.: WO2004/075152

PCT Pub. Date: Sep. 2, 2004

(65) Prior Publication Data

US 2006/0209054 A1 Sep. 21, 2006

(30) Foreign Application Priority Data

Feb. 20, 2003 (JP) ............................ 2003-042941

(51) Int. Cl.
*G06T 15/70* (2006.01)

(52) U.S. Cl. ...................... 345/475; 345/611; 345/589; 382/300

(58) Field of Classification Search ...................... None
See application file for complete search history.

(56) References Cited

U.S. PATENT DOCUMENTS 6,563,862 B1 * 5/2003 Knutson et al. ............. 375/219
2001/0035874 A1 11/2001 Hamilton et al.
2002/0060746 A1 * 5/2002 Yugami et al. ............. 348/458

(Continued)

FOREIGN PATENT DOCUMENTS

JP 03-231796 A 10/1991

(Continued)

*Primary Examiner*—Kee M. Tung
*Assistant Examiner*—Jwalant Amin
(74) *Attorney, Agent, or Firm*—Lerner, David, Littenberg, Krumholz & Mentlik, LLP

(57) ABSTRACT

An apparatus for processing an image signal prevents burn-in of display devices such as a PDP and an LCD. A number-of-pixels conversion section generates pixel data located at interpolation positions in horizontal or vertical directions based on information about the interpolation positions obtained from a controller, to obtain an image signal in which the number of pixels is converted. A panel driver shifts the display position of an image in a PDP in the horizontal or vertical directions by as much as one pixel, each time a predetermined period of time elapses, within a predetermined range based on information about the display position obtained from the controller in order to prevent a screen from being burned-in. The controller changes the phase of each of the interpolation positions in a change unit smaller than 360° for a period of time when the display position of the image is shifted by as much as one pixel, the interval between the interpolation positions being set to 360°. This allows the shift distance of the image in every shift to be shorter than the distance between the pixels, thereby allowing any unpleasant visual feeling due to the image movement to be mitigated.

9 Claims, 10 Drawing Sheets

U.S. PATENT DOCUMENTS

2003/0034984 A1 * 2/2003 Murata ........................ 345/589

FOREIGN PATENT DOCUMENTS

| | | | |
|---|---|---|---|
| JP | 04-116691 | A | 4/1992 |
| JP | 07-023290 | A | 1/1995 |
| JP | 08-248934 | A | 9/1996 |
| JP | 10-233942 | A | 9/1998 |
| JP | 2000-338947 | A | 12/2000 |
| JP | 2001-134227 | A | 5/2001 |
| JP | 2001-333272 | A | 11/2001 |
| JP | 2002-049365 | A | 2/2002 |
| JP | 2002-197454 | A | 7/2002 |

* cited by examiner (PC INPUT)

(TV INPUT)

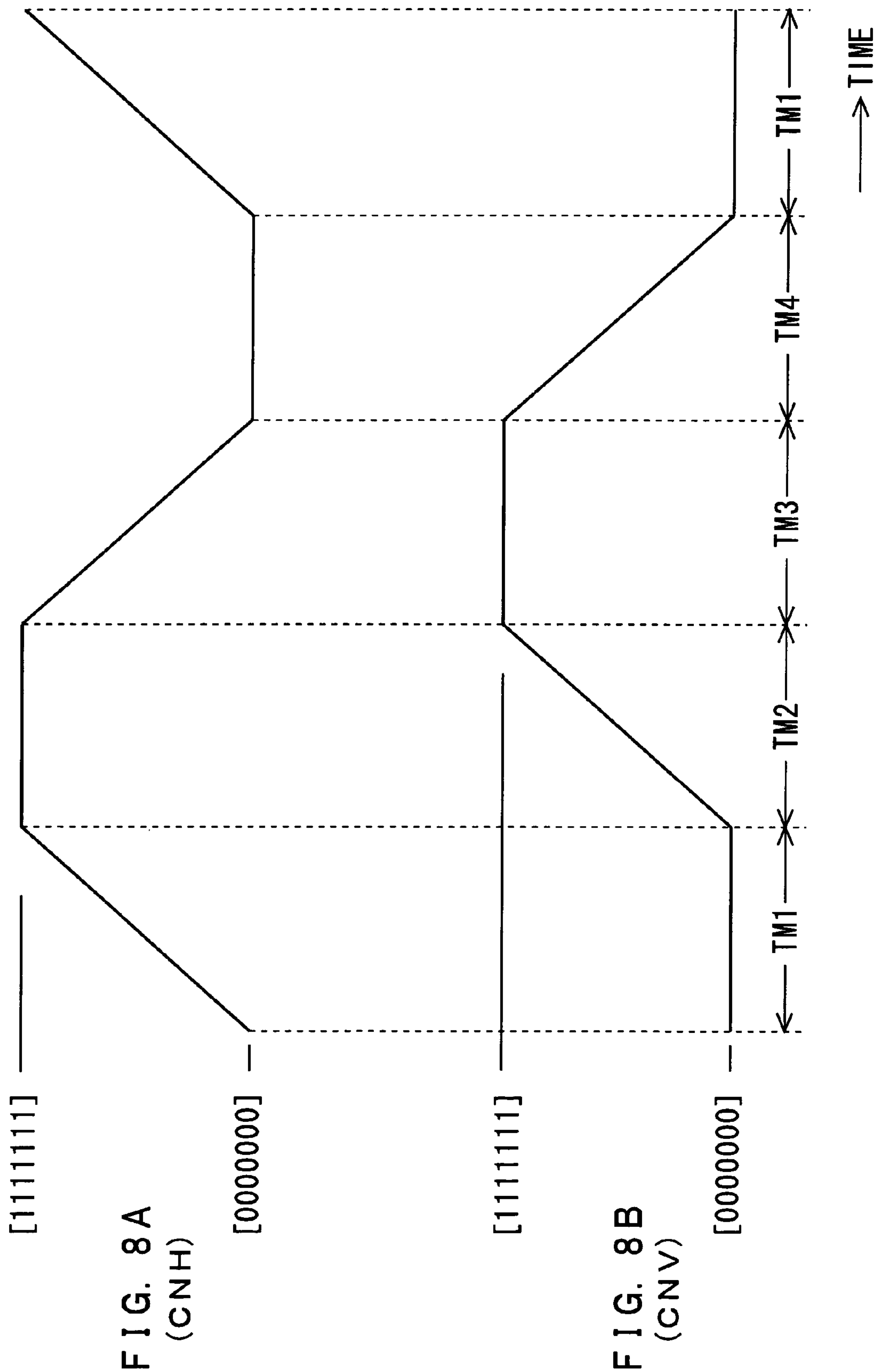
FIG. 8A (CNH)
FIG. 8B (CNV)

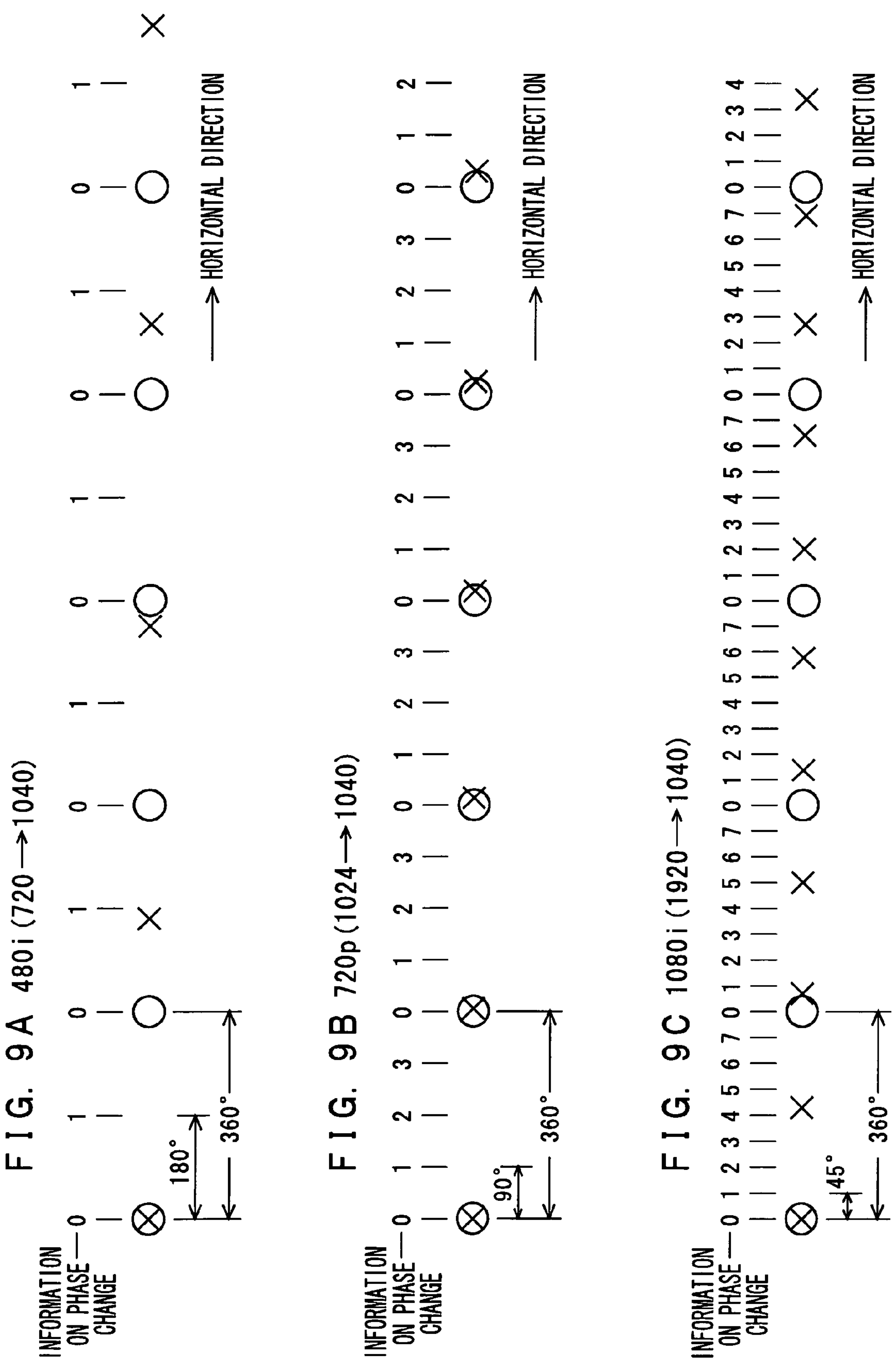
FIG. 9A 480i (720→1040)
FIG. 9B 720p (1024→1040)
FIG. 9C 1080i (1920→1040)
INFORMATION ON PHASE CHANGE
HORIZONTAL DIRECTION
180°
360°
90°
45°

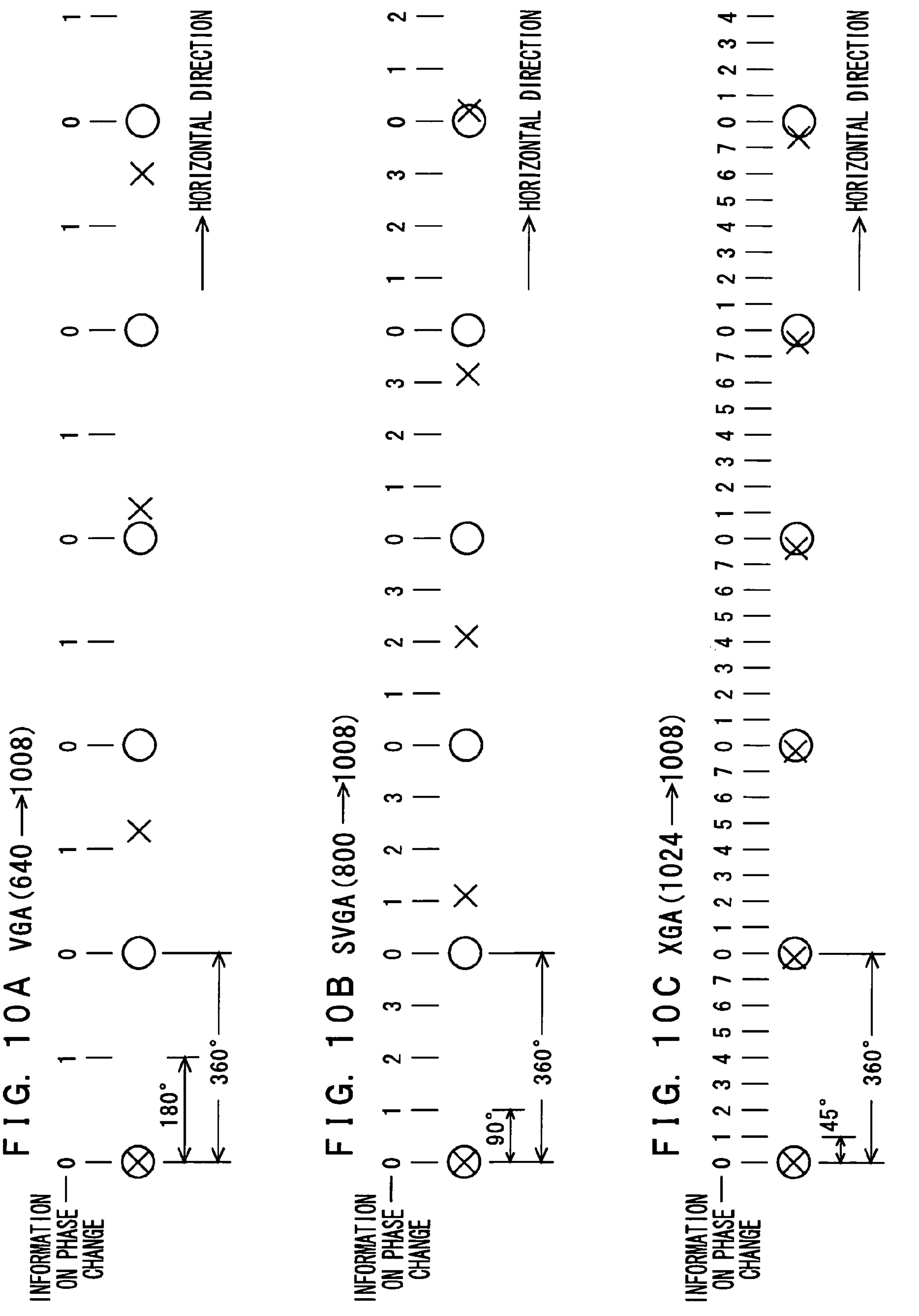
FIG. 10A VGA(640→1008)
FIG. 10B SVGA(800→1008)
FIG. 10C XGA(1024→1008)

APPARATUS AND METHOD FOR PROCESSING IMAGE SIGNAL AND IMAGE DISPLAY APPARATUS UTILIZING THE SAME

BACKGROUND OF THE INVENTION

The present invention relates to an apparatus and a method for processing an image signal in order to prevent a display device such as a plasma display panel (PDP) from being burned-in and an image display apparatus utilizing the same. More specifically, the present invention relates to an apparatus for processing an image signal, etc. that generates pixel data located at interpolation positions at least in a horizontal or vertical interpolation direction based on pixel data contained in the input image signal to thereby obtain an output image signal in which the number of pixels in this interpolation direction is converted, whereby an unpleasant visual feeling due to movement of an image for the purpose of prevention of burn-in on a screen may be mitigated by changing a phase of each of the interpolation positions uniformly across all the pixels in a change unit smaller than 360° each time a predetermined time elapses, an interval between the adjacent interpolation positions being set to 360°, for every period of time a display position of the image is shifted by as much as one pixel, the period of time pertaining to a case where the display position of the image due to the output image signal is shifted by as much as one pixel in the interpolation direction, thereby allowing a pixel position of each of the interpolation positions to be shifted in the interpolation direction by a distance shorter than a distance between the pixels.

Conventionally, a PDP, for example, is known as a flat display panel. This PDP comprises two glass substrates between which rare gas including neon as its main component is contained and a pair of discharge electrodes which are regularly arranged, wherein by utilizing ultraviolet light generated through a discharge emission phenomenon that occurs when a voltage is applied to minute discharge cells formed at intersections between these two electrodes, fluorescent substances for three primary color signals of red (R), green (G), and blue (B) are stimulated, thereby emitting light therefrom so that a color image may be obtained.

The PDPs are grouped into a DC type and an AC type in accordance with the structure and driving method thereof. The DC type PDP has the electrodes exposed into a discharge space and emits light only during a period of time when a voltage is applied on it. Additionally, it is provided with a memory function by use of a driving method referred to as “a pulse memory approach”, which utilizes such a phenomenon that excited particles generated by discharge will facilitate subsequent discharge. The AC type PDP has electrodes covered by a dielectric substance (glass layer) in such a configuration that this dielectric substance serves as a capacitor, so that light emission is stopped instantaneously. Since this pulsed emission is repeated, AC voltages with alternating polarities are applied to the electrodes. Further, it has an influence on the effective voltage within the cell, which phenomenon provides the memory function whether the charge accumulated on a surface of the dielectric substance by discharge stays or not.

An image display apparatus using this PDP has an advantage of having a high luminance, a wide view angle, and a high capacity ratio and, therefore, is widely available as a display device for a personal computer, etc. However, if a still image is displayed on this PDP for a long period of time, so-called burn-in on the screen occurs, thereby deteriorating the displayed image.

To solve this problem, if an image is a still image and is displayed for a certain period of time, customarily the display position of the image is moved to prevent the image from being burned-in on the screen (see Jpn. Pat. Appln. Laid Open Publication No. 2000-338947).

To prevent burn-in on the screen, in the above-described case of moving the position where the image is displayed, the image is moved in pixel units. Therefore, it has a problem that such movement of the image gives an unpleasant visual feeling to a viewer.

SUMMARY OF THE INVENTION

It is an object of the present invention to mitigate an unpleasant visual feeling that occurs when an image moves in order to prevent itself from being burnt-in on a screen.

An apparatus for processing an image signal according to the invention comprises number-of-pixels conversion means for generating pixel data located at interpolation positions at least in a horizontal or vertical interpolation direction based on an input image signal, to obtain an output image signal in which the number of pixels in the interpolation direction is converted, and interpolation phase control means for uniformly changing a phase of each of the interpolation positions in the number-of-pixels conversion means in a change unit smaller than 360° each time a first lapse of time elapses, an interval between the interpolation positions being set to 360°.

A method for processing an image signal according to the invention comprises the steps of generating pixel data located at interpolation positions at least in a horizontal or vertical interpolation direction based on an input image signal, to obtain an output image signal in which the number of pixels in the interpolation direction is converted, and uniformly changing a phase of each of the interpolation positions in a change unit smaller than 360° each time a first lapse of time elapses, an interval between the interpolation positions being set to 360°.

An image display apparatus according to the invention comprises number-of-pixels conversion means for generating pixel data located at interpolation positions at least in a horizontal or vertical interpolation direction based on an input image signal, to obtain an output image signal in which the number of pixels in the interpolation direction is converted, a display device for displaying an image due to the output image signal obtained at the number-of-pixels conversion means, display position control means for shifting a display position of an image displayed on the display device by as much as one pixel in the interpolation direction each time a second lapse of time elapses, and interpolation phase control means for uniformly changing a phase of each of the interpolation positions in the number-of-pixels conversion means in a change unit smaller than 360° each time a first lapse of time smaller than the second lapse of time elapses, an interval between the interpolation positions being set to 360°.

In the present invention, pixel data located at interpolation positions in at least a horizontal or vertical interpolation direction is generated on the basis of an input image signal to thereby obtain an output image signal in which the number of pixels in this interpolation direction is converted. An image due to this output image signal is displayed on a display device. For example, a position where the image is displayed is shifted by as much as one pixel in the interpolation direction each time a second lapse of time elapses.

A phase of each of the interpolation positions is uniformly changed each time a first lapse of time elapses. In this case, a unit of change is set to a value smaller than 360° on the assumption that an interval between the interpolation positions is 360°. As described above, when the image display position is shifted each time the second lapse of time elapses, the first lapse of time is set to, for example, (1/N) (N is 2 or a larger integer) of the second lapse of time, so that the change unit for the phases of the interpolation positions is set to (1/N) of 360°. Information about the interpolation positions and that of the change unit are acquired on the basis of a format of the input image signal.

An image displayed on a display device moves each time a predetermined lapse of time elapses, so that it is possible to prevent the image from being burnt-in on a screen. In this case, a distance by which the image moves each time is shorter than an inter-pixel spacing on the display device, which is, for example, (1/N) of the inter-pixel spacing on the display device. This allows an unpleasant visual feeling due to movement of the image for the purpose of prevention of burn-in on the screen to be mitigated.

For example, the smaller a conversion ratio m/n is, the smaller the change unit is made, where n is the number of pixels of the input image signal in the interpolation direction, m is the number of pixels of the output image signal in the interpolation direction, and m/n is the conversion ratio. Although movement of an image becomes more conspicuous as the conversion ratio m/n decreases, as described above, the conspicuousness of the image movement is well mitigated by decreasing the change unit.

Further, for example, in a case where an image signal having the same number of pixels as that of an input image signal is provided as an output image signal, it is possible to leave the phases at the interpolation positions unchanged. In this case, so-called real display is conducted on the display device, so that it is possible to prevent an image from blurring due to a change in phase.

BRIEF DESCRIPTION OF THE DRAWINGS

FIGS. 8A and 8B are explanatory illustrations each for illustrating transition in count value of a horizontal counter and a vertical counter at the information generation section for orbiting control;

FIGS. 9A, 9B, and 9C are explanatory illustrations each for illustrating a change in phase of an interpolation position;

FIGS. 10A, 10B, and 10C are explanatory illustrations each for illustrating a change in phase of the interpolation position.

DETAILED DESCRIPTION

The following will describe an embodiment of the present invention with reference to the drawings.

Figure 1:
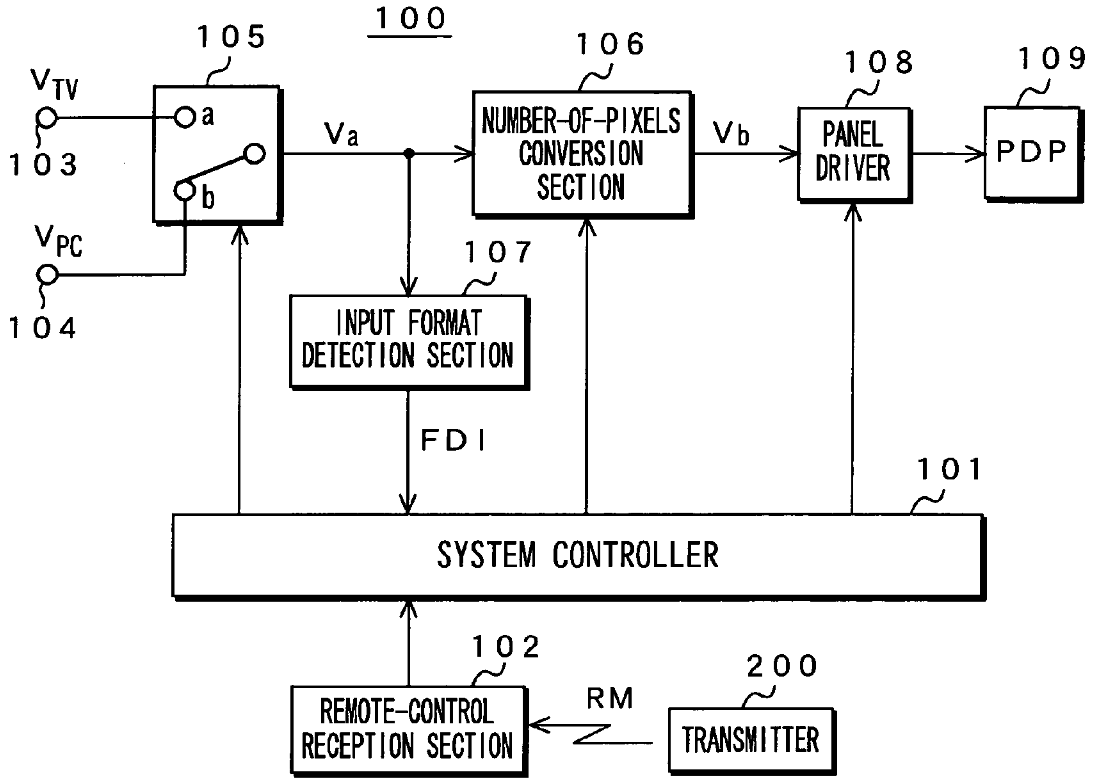
FIG. 1 is a block diagram for showing a configuration of an image display apparatus according to an embodiment of the invention.

FIG. 1 shows a configuration of an image display apparatus 100 according to an embodiment of the invention. This image display apparatus 100 comprises a system controller 101 for controlling operations of the entire apparatus and a remote-control signal reception section 102 for receiving a remote-control signal. The remote-control signal reception section 102 receives a remote-control signal RM from a remote-control transmitter 200 in response to an operation of a user and supplies an operation signal corresponding to this signal RM to the system controller 101.

The image display apparatus 100 further comprises an input terminal 103 for receiving an image signal $V_{TV}$ as a TV input and an input terminal 104 for receiving an image signal $V_{PC}$ as a PC input.

In the present embodiment, as the image signal $V_{TV}$, a 480i signal (SDTV signal), a 720p signal, or a 1080i signal (HDTV signal) is input. It is to be noted that the numeric value represents the number of lines, "i" represents the interlace system, and "p" represents the progressive system. For example, the 480i signal has a resolution of 720×480 dots, the 720p signal has a resolution of 1024×720 dots, and the 1080i signal has a resolution of 1920×1080 dots.

Further, in the present invention, as the image signal $V_{PC}$, a VGA standards-compliant image signal (VGA signal), an SVGA standards-compliant image signal (SVGA signal), or an XGA standards-compliant image signal (XGA signal) is input. For example, the VGA signal has a resolution of 640×480 dots, the SVGA signal has a resolution of 800×600 dots, and the XGA signal has a resolution of 1024×768 dots.

The image display apparatus 100 further comprises a transfer switch 105 for selectively picking up the image signal $V_{TV}$ input to the input terminal 103 or the image signal $V_{PC}$ input to the input terminal 104. The input terminal 103 is connected to a fixed terminal "a" of the transfer switch 105, and the input terminal 104 is connected to a fixed terminal "b" of the transfer switch 105.

The image display apparatus 100 further comprises a number-of-pixels conversion section 106 for converting the horizontal and vertical numbers of pixels of an image signal Va picked up as an input image signal at the transfer switch 105, to obtain an image signal Vb as an output image signal. The number-of-pixels conversion section 106 can convert the horizontal and vertical numbers of pixels to thereby obtain the image signal Vb having a resolution different from that of the image signal Va.

In the present embodiment, if the image signal Va is the image signal $V_{TV}$, an image signal having a resolution of 1040×784 dots is obtained as the image signal Vb, and if the image signal Va is the image signal $V_{PC}$, an image signal having a resolution of 1008×752 dots is obtained as the image signal Vb.

Figure 2:
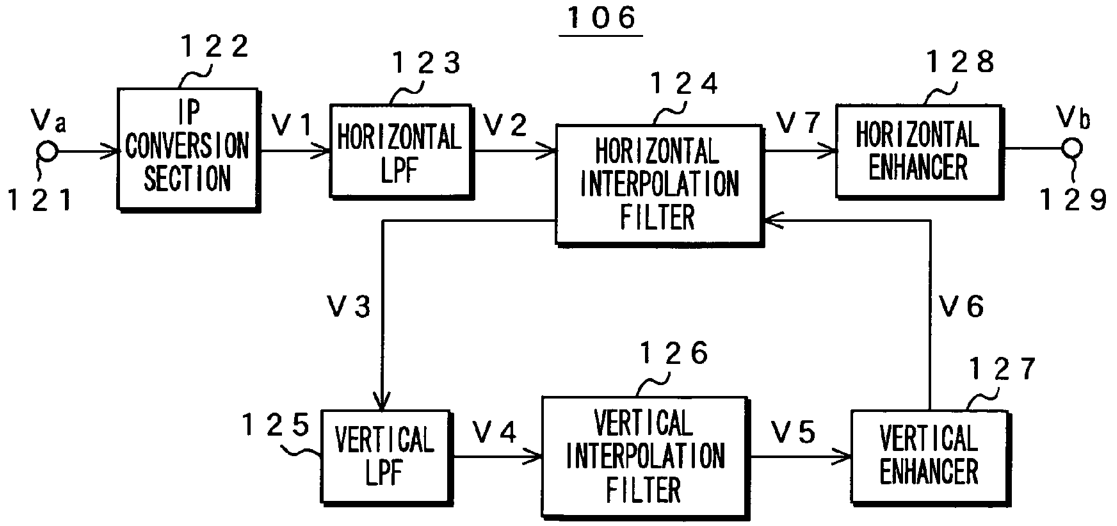
FIG. 2 is a block diagram for showing a configuration of a number-of-pixels conversion section.

The following will describe in detail the number-of-pixels conversion section 106. FIG. 2 shows a configuration example of the number-of-pixels conversion section 106.

The number-of-pixels conversion section 106 comprises an input terminal 121 for receiving the image signal Va and an IP conversion section 122 for performing interlace-progressive (IP) conversion processing on the image signal Va input to this input terminal 121. The IP conversion section 122, if the image signal Va is of the interlace system, converts this signal into a progressive-system image signal and outputs it, and if the image signal Va is of the progressive system, outputs it as it is.

The number-of-pixels conversion section 106 further comprises a horizontal low-pass filter 123. This horizontal low-pass filter 123 is supplied with an image signal V1 output from the IP conversion section 122. This horizontal low-pass filter 123 outputs, as an image signal V2, the image signal V1 by limiting its horizontal bandwidth to prevent turn-back distortion from occurring when decreasing the number of horizontal pixels (for horizontal reduction) and, when increasing the number of horizontal pixels (for horizontal expansion), on the other hand, outputs the image signal V1 as it is as the image signal V2.

The the-number-of-pixels conversion section 106 further comprises a horizontal interpolation filter 124 for converting the number of horizontal pixels by performing interpolation processing thereon to generate pixel data at an interpolation position. This horizontal interpolation filter 124 is supplied with the image signal V2 output from the horizontal low-pass filter 123 and an image signal V6 output from a later-described vertical enhancer 127.

For horizontal reduction, this horizontal interpolation filter 124 outputs, as an image signal V3, the image signal V2 by converting the number of its horizontal pixels to a smaller number and outputs the image signal V6 as it is as an image signal V7. For horizontal expansion, on the other hand, this horizontal interpolation filter 124 outputs the image signal V2 as it is as an image signal V3 and outputs the image signal V6 by converting the number of its horizontal pixels to a larger number, as an image signal V7.

The number-of-pixels conversion section 106 further comprises a vertical low-pass filter 125. This vertical low-pass filter 125 is supplied with the image signal V3 output from the horizontal interpolation filter 124. When decreasing the number of vertical pixels of the image signal V3 (for vertical reduction), in order to prevent turn-back distortion from occurring, this vertical low-pass filter 125 outputs this image signal V3, as an image signal V4, by limiting its vertical bandwidth and, when increasing the number of vertical pixels of the image signal V3 (for vertical expansion), on the other hand, outputs the image signal V3 as it is as the image signal V4.

The number-of-pixels conversion section 106 further comprises a vertical interpolation filter 126 for converting the number of vertical pixels by performing interpolation processing thereon to generate pixel data at an interpolation position. This vertical interpolation filter 126 is supplied with the image signal V4 output from the vertical low-pass filter 125. For vertical reduction, this vertical interpolation filter 126 outputs, as an image signal V5, the image signal V4 by converting the number of vertical pixels (the number of vertical scan-lines) to a smaller number. For vertical expansion, on the other hand, this vertical interpolation filter 126 outputs the image signal V4 by converting the number of vertical pixels to a larger number, as the image signal V5.

The number-of-pixels conversion section 106 further comprises the vertical enhancer 127. This vertical enhancer 127 is supplied with the image signal V5 output from the vertical interpolation filter 126. For vertical expansion, this vertical enhancer 127 outputs, as the image signal V6, the image signal V5 by enhancing its high vertical region in order to mitigate blurring of an image and, for vertical reduction, on the other hand, outputs the image signal V5 as it is as the image signal V6.

The number-of-pixels conversion section 106 further comprises a horizontal enhancer 128 and an output terminal 129 for outputting as the image signal Vb a signal output by this horizontal enhancer 128.

The horizontal enhancer 128 is supplied with the image signal V7 output from the horizontal interpolation filter 124. For horizontal expansion, this horizontal enhancer 128 outputs, as the image signal Vb, the image signal V7 by enhancing its high horizontal region in order to mitigate blurring of an image and, for horizontal reduction, on the other hand, outputs the image signal V7 as it is as the image signal Vb.

Figures 3A, 3B, 3C:
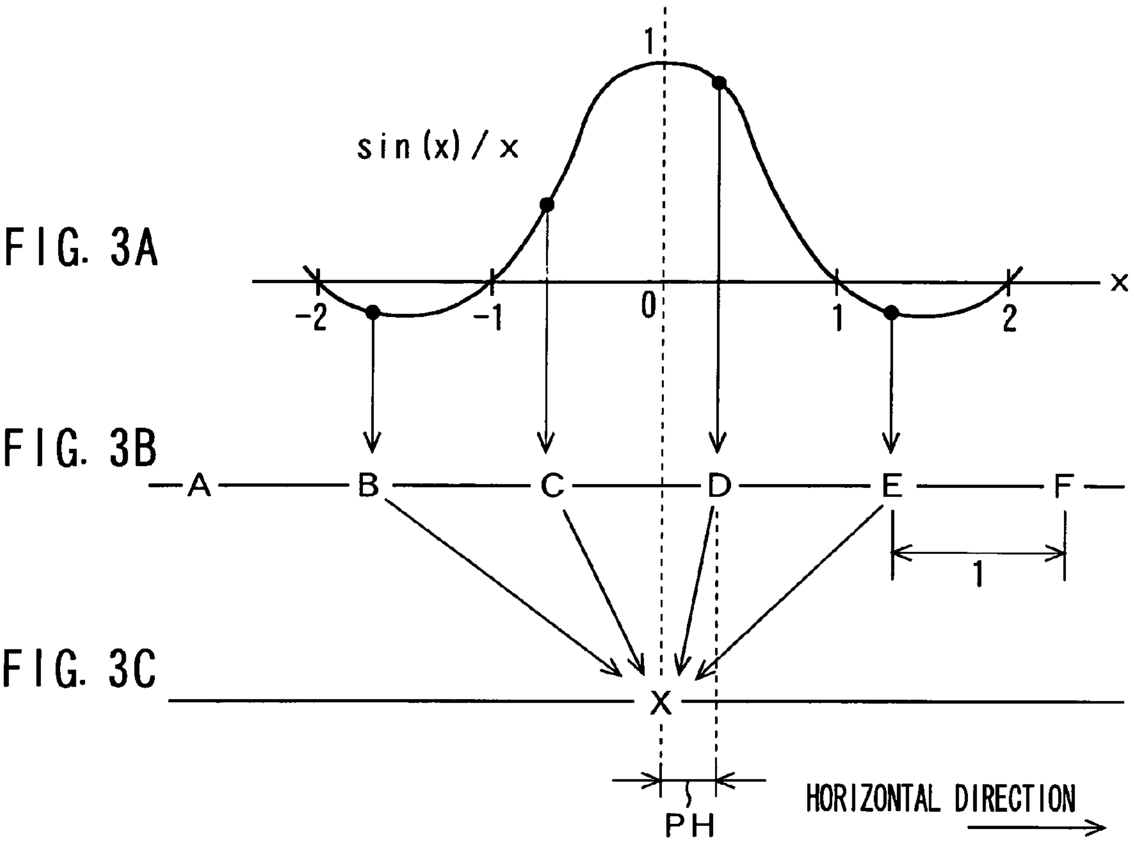
FIGS. 3A, 3B, and 3C are explanatory illustrations each for illustrating interpolation processing in a case where sin(x)/x is used as an interpolation function.

The following will describe interpolation processing performed by the horizontal interpolation filter 124. The horizontal interpolation filter 124 performs interpolation processing by use of, for example, sin(x)/x as an interpolation function. FIGS. 3A to 3C show interpolation processing in a case where sin(x)/x is used as the interpolation function. It is to be noted that in FIGS. 3A to 3C, the inter-pixel spacing in the horizontal direction is assumed to be 1.

In this case, to give pixel data X of FIG. 3C that is interposed between items of horizontal pixel data C and D shown in FIG. 3B, the interpolation function is arranged so that its vertex may be located to a position that corresponds to the pixel data X as shown in FIG. 3A.

By assuming then a value of the vertex of the interpolation function to be 1 and multiplexing the items of pixel data B, C, D, and E by the corresponding values of the items of pixel data B, C, D, and E, respectively, and summing them up, the pixel data X is obtained.

Figure 4:
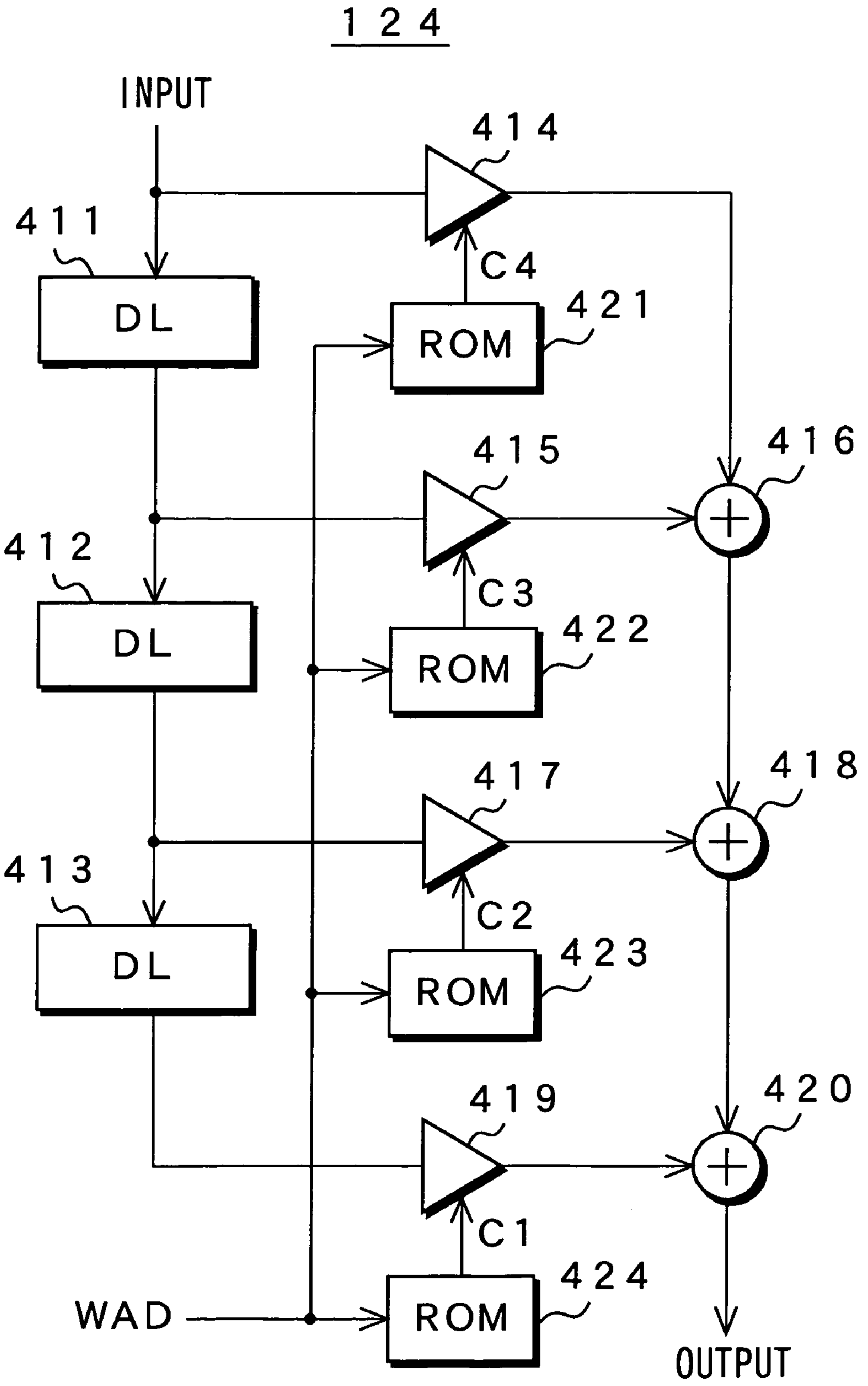
FIG. 4 is a block diagram for showing a configuration example of a horizontal interpolation filter (four-tap configuration)

FIG. 4 shows a configuration example of the horizontal interpolation filter 124 for performing interpolation processing by use of sin(x)/x.

An input signal is input to a series circuit made up of three delay circuits (DL) 411 to 413 each of which has a delay of one pixel lapse of time. A signal obtained by multiplying the input signal by a coefficient C4 at a multiplier 414 and a signal obtained by multiplying an output signal of the delay circuit 411 by a coefficient C3 at a multiplier 415 are summed up by an adder 416.

Further, an output signal of this adder 416 and a signal obtained by multiplying an output signal of the delay circuit 412 by a coefficient C2 at a multiplier 417 are summed up by an adder 418. Furthermore, an output signal of the adder 418 and a signal obtained by multiplying an output signal of the delay circuit 413 by a coefficient C1 at a multiplier 419 are summed up by an adder 420. An output signal of this adder 420 is placed as an output signal of the horizontal interpolation filter 124.

Figure 5:
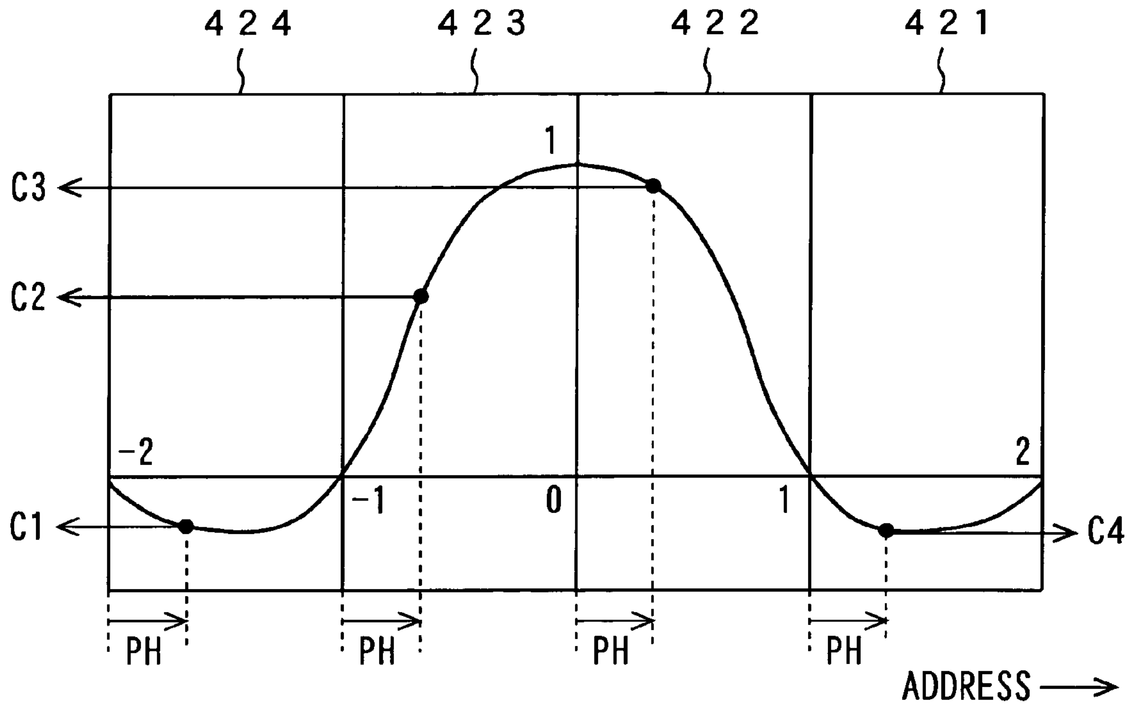
FIG. 5 is an explanatory illustration for illustrating an interpolation coefficient ROM.

The multipliers 414, 415, 417, and 419 are supplied with the coefficients C4, C3, C2, and C1 from interpolation coefficient ROMs 421, 422, 423, and 424, respectively. As shown in FIG. 5, values of the interpolation function in ranges of $1 \leqq x < 2$, $0 \leqq x < 1$, $-1 \leqq x < 0$, and $-2 \leqq x < -1$ are stored in the interpolation coefficient ROMs 421, 422, 423, and 424, respectively.

By supplying these interpolation coefficient ROMs 421, 422, 423, and 424 with a read address WAD that corresponds to a phase PH at an interpolation position (horizontal spacing between the items of pixel data X and D in the processing example of FIG. 3), the coefficients C4, C3, C2, and C1 that correspond to this phase PH at the interpolation position are read out.

Although not detailed, the vertical interpolation filter 126 also performs interpolation processing by use of, for example, sin (x)/x similar to the above-described horizontal interpolation filter 124. In this case, the vertical interpolation filter 126 can be configured by, for example, assigning a delay of one horizontal period of time to each of the delay circuits 411 to 413 in the horizontal interpolation filter 124 shown in FIG. 4.

The following will describe operations of the number-of-pixels conversion section 106 as shown in FIG. 2.

First, a case where the numbers of horizontal and vertical pixels are decreased will be explained.

The image signal V1 output from the IP conversion section 122 is input to the horizontal low-pass filter 123. This horizontal low-pass filter 123 outputs, as the image signal V2, the image signal V1 by limiting its horizontal bandwidth to prevent turn-back distortion from occurring. This image signal V2 is input to the horizontal interpolation filter 124. The horizontal interpolation filter 124 outputs, as the image signal V3, the image signal V2 by converting its number of horizontal pixels to a smaller number.

The image signal V3 output from the horizontal interpolation filter 124 is input to the vertical low-pass filter 125. The vertical low-pass filter 125 outputs, as the image signal V4, the image signal V3 by limiting its vertical bandwidth to prevent turn-back distortion from occurring. This image signal V4 is input to the vertical interpolation filter 126. The vertical interpolation filter 126 outputs, as the image signal V5, the image signal V4 by converting its number of vertical pixels (number of vertical scan-lines) to a smaller number.

The image signal V5 output from the vertical interpolation filter 126 is input to the vertical enhancer 127, which in turn outputs this image signal as it is as the image signal V6. Further, this image signal V6 is input to the horizontal interpolation filter 124, which in turn outputs this image signal V6 as it is as the image signal V7.

Further, this image signal V7 is input to the horizontal enhancer 128, which in turn outputs this signal as it is as the image signal Vb. This image signal Vb has decreased numbers of horizontal and vertical pixels as compared with those of the image signal Va.

Next, a case where the numbers of horizontal and vertical pixels are increased will be explained.

The image signal V1 output from the IP conversion section 122 is input to the horizontal low-pass filter 123, which in turn outputs this image signal as it is as the image signal V2. This image signal V2 is input to the horizontal interpolation filter 124, which in turn outputs this image signal as it is as the image signal V3. Then, this image signal V3 is input to the vertical low-pass filter 125, which in turn outputs this image signal as it is as the image signal V4.

The image signal V4 output from the vertical low-pass filter 125 is input to the vertical interpolation filter 126. The vertical interpolation filter 126 outputs, as the image signal V5, the image signal V4 by converting its number of vertical pixels to a larger number. This image signal V5 is input to the vertical enhancer 127. The vertical enhancer 127 outputs, as the image signal V6, the image signal V5 by enhancing its high vertical region in order to mitigate blurring of an image.

The image signal V6 output from the vertical enhancer 127 is input to the horizontal interpolation filter 124. The horizontal interpolation filter 124 outputs, as the image signal V7, the image signal V6 by converting its number of horizontal pixels to a larger number. This image signal V7 is input to the horizontal enhancer 128. The horizontal enhancer 128 outputs, as the image signal Vb, the image signal V7 by enhancing its high horizontal region in order to mitigate blurring of an image. This image signal Vb has increased numbers of horizontal and vertical pixels as compared with those of the image signal Va.

It is to be noted that it is necessary for the number-of-pixels conversion section 106 to have information on horizontal and vertical interpolation positions to convert the number of the horizontal and vertical pixels. The information on the interpolation positions varies with the format of the image signal Va. This information on the interpolation positions is supplied from the system controller 101 to the number-of-pixels conversion section 106. The system controller 101 acquires the information on interpolation positions that corresponds to the format of the image signal Va from, for example, a ROM table, not shown, based on the format of the image signal Va detected by a later-described input format detection section 107.

Referring back to FIG. 1, the image display apparatus 100 comprises the input format detection section 107 for detecting the format of the image signal Va to be picked up by the transfer switch 105. This detection section 107 detects, based on the horizontal frequency of the image signal Va, etc., whether this image signal Va is a 480i signal, a 720p signal, a 1080i signal, a VGA signal, an SVGA signal, or an XGA signal.

The detection section 107 supplies format detection information FDI to the system controller 101. The system controller 101, based on this format detection information FDI, acquires information on interpolation positions, which corresponds to the format of the image signal Va as described above, and supplies it to the number-of-pixels conversion section 106.

Further, as described later, the system controller 101 performs control for burn-in preventing processing in order to prevent burn-in on a screen from occurring. To perform this control, it shifts the display position of an image horizontally and vertically by as much as one pixel each time T2 elapses and also, for every period of time when a display position of the image is shifted by as much as one pixel, it changes the phase of each of the interpolation positions at the number-of-pixels conversion section 106 uniformly across all pixels each time T1 elapses, which T1 is 1/N (N: 2 or a larger integer) of the time T2, in units of 1/N of 360° on the assumption that the interval between the adjacent interpolation positions is 360°.

Based on the above-described format detection information FDI, the system controller 101 acquires a value of N that corresponds to the format of the image signal Va from, for example, the ROM table. In the present embodiment, N is 2, 4, or 8. That is, if the image signal Va is a 480i signal or a VGA signal, N=2; if the image signal Va is a 720p signal or an SVGA signal, N=4; and if the image signal Va is a 1080i signal or an XGA signal, N=8.

The image display apparatus 100 further comprises a PDP 109 as a display device and a panel driver 108 for driving the PDP 109 based on the image signal Vb obtained at the number-of-pixels conversion section 106, thereby displaying the image due to the image signal Vb on a screen of the PDP 109.

In the present embodiment, the PDP 109 is compliant with the XGA standards and equipped with a display screen having 1024 (horizontal)×768 (vertical) pixels.

Figure 6A:
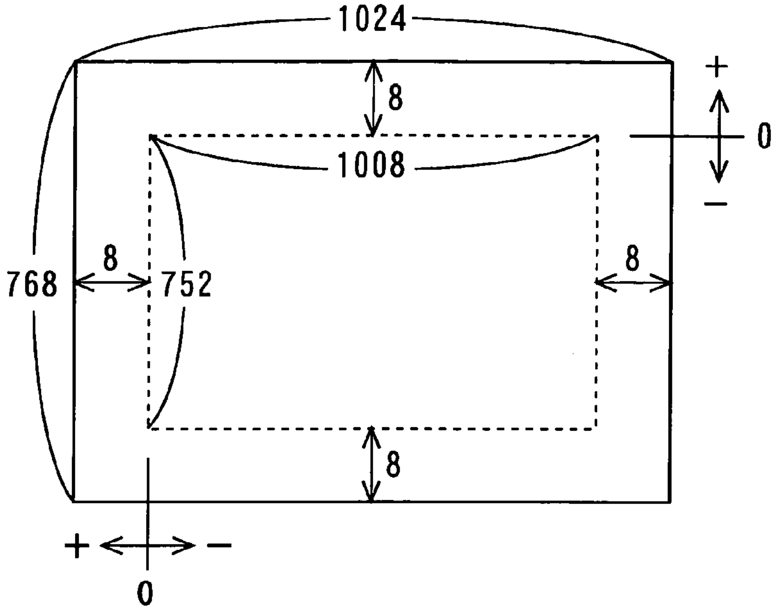
FIGS. 6A and 6B are explanatory illustrations for illustrating number-of-pixels conversion and image display.

As described above, if the image signal Va is an image signal $V_{PC}$ as a PC input, the image signal Vb obtained at the number-of-pixels conversion section 106 has a resolution of 1008×752 dots. In this case, pixel data of the 1008×752 pixels of the image signal Vb corresponds to the screen of the PDP 109 as indicated by a dotted line in FIG. 6A, so that an image due to the image signal Vb is displayed in a condition where it is under-scanned. In this case, the region where the pixel data does not exist is displayed in black.

The image due to the image signal Vb is thus displayed in an under-scanned condition in order to avoid such a situation that the image related to the PC input may not be displayed at all when, as described later, the position where the image is displayed is shifted through burn-in preventing processing control for the purpose of preventing the image from being burned-in on the screen.

Further, as described above, if the image signal Va is an image signal $V_{TV}$ as a TV input, the image signal Vb obtained at the number-of-pixels conversion section 106 has a resolution of 1040×784 dots. In this case, pixel data of the 1040×784 pixels of the image signal Vb corresponds to the screen of the PDP 109 as indicated by a dotted line in FIG. 6B, so that an image due to the image signal Vb is displayed in a condition where it is over-scanned.

The image due to the image signal Vb is thus displayed in an over-scanned condition in order to avoid such a situation that some of regions of the image related to the TV input may not be displayed on the screen to give an unpleasant feeling to a viewer when, as described later, the image display position is shifted through burn-in preventing processing control.

The system controller 101 performs burn-in preventing control processing in order to prevent burn-in on the screen from occurring. In this case, the system controller 101 supplies the panel driver 108 with information on horizontal and vertical display positions. Based on this display position information, the panel driver 108 shifts the display position of an image on the PDP 109. In the present embodiment, the display position of an image displayed on the PDP 109 is shifted by as much as one pixel each time T2 elapses in a range of −7 pixels through +8 pixels horizontally and vertically using the position of the broken lines of FIGS. 6A and 6B as a zero point.

Figure 7:
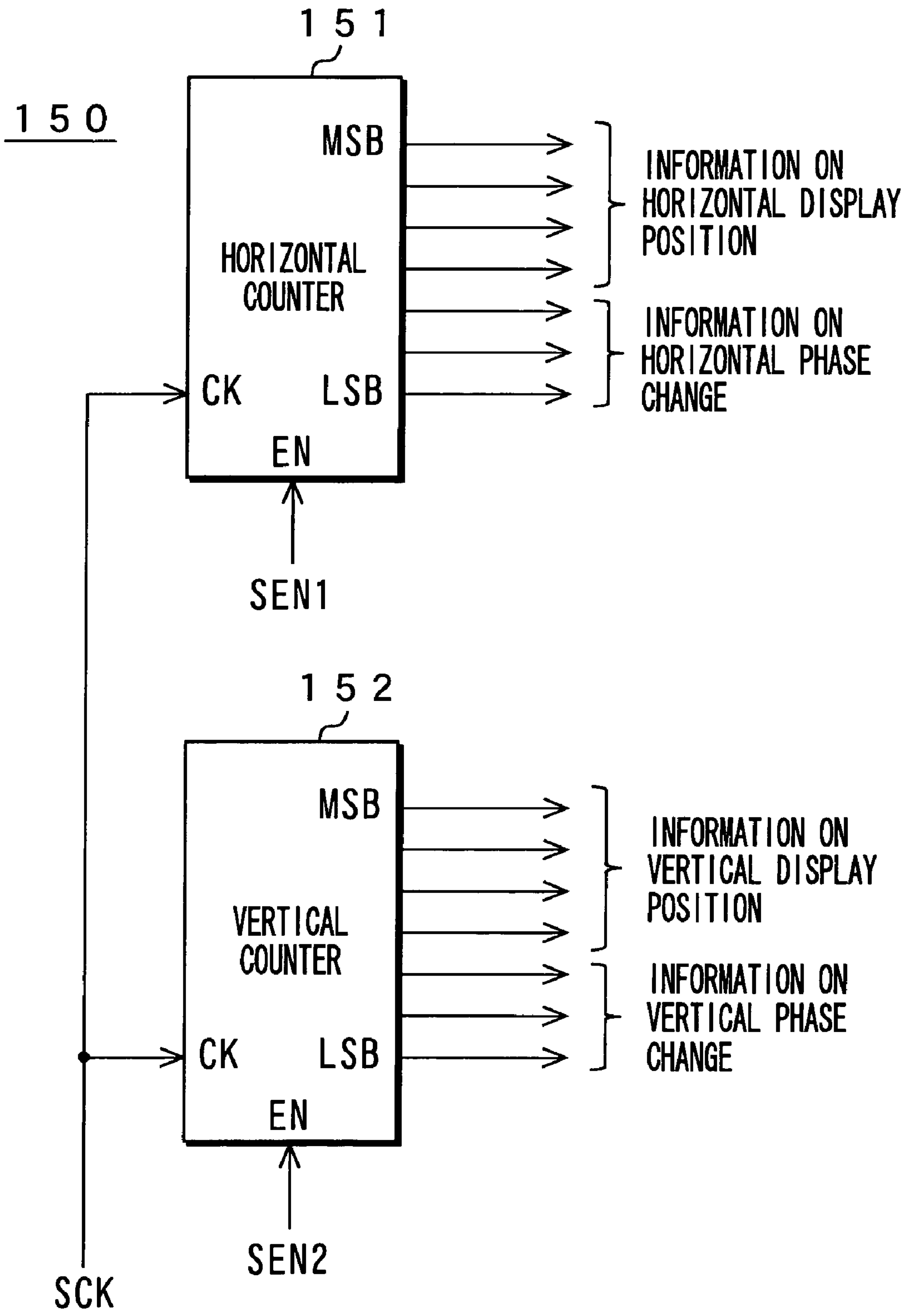
FIG. 7 is a block diagram for showing a configuration of an information generation section for burn-in preventing processing control.

The following will describe an information generation section 150 for generating information for burn-in preventing processing control in the system controller 101. FIG. 7 shows a configuration of this information generation section 150.

This information generation section 150 is equipped with a horizontal counter 151 made up of an up/down counter and a vertical counter 152 made up of an up/down counter. The horizontal counter 151 and the vertical counter 152 are each of seven bits, so that when they count a maximum value of "1111111" in an up-counting mode, they turn into a down-counting mode, and when they count a minimum value of "0000000" in a down-counting mode, on the other hand, they turn into an up-counting mode.

Each of the horizontal counter 151 and the vertical counter 152 is supplied, at its clock signal terminal CK, with a clock signal SCK that has a cycle time of, for example, several seconds. Further, the horizontal counter 151 is supplied, at its ENABLE terminal EN, with an ENABLE signal SEN1 that controls count operations of this horizontal counter 151. The vertical counter 152, on the other hand, is supplied at its ENABLE terminal EN with an ENABLE signal SEN2 that controls count operations of this vertical counter 152.

In the present embodiment, a count value CNH of the horizontal counter 151 and a count value CNV of the vertical counter 152 are controlled so as to go through from a first period TM1 to a fourth period TM4 repeatedly as shown in FIGS. 8A and 8B, respectively.

In the first period TM1, the horizontal counter 151 counts (in the up-counting mode) in accordance with the clock signal SCK, to have its count value CNH change from "0000000" to "1111111". Further, in this first period TM1, the vertical counter 152 does not count, thus having its count value CNV left at "0000000".

In the second period TM2, the horizontal counter 151 does not count, thus having its count value CNH left at "1111111". Further, in this second period TM2, the vertical counter 152 counts (in the up-counting mode) in accordance with the clock signal SCK, to have its count value CNV change from "0000000" to "1111111".

In the third period TM3, the horizontal counter 151 counts (in the down-counting mode) in accordance with the clock signal SCK, to have its count value CNH change from "1111111" to "0000000". Further, in this third period TM3, the vertical counter 152 does not count, thus having its count value CNV left at "1111111".

In the fourth period TM4, the horizontal counter 151 does not count, thus having its count value CNH left at "0000000". Further, in this fourth period TM4, the vertical counter 152 counts (in the down-counting mode) in accordance with the clock signal SCK, to have its count value CNV change from "1111111" to "0000000".

The system controller 101 supplies the panel driver 108 with data of high-order four bits of the count value CNH of the horizontal counter 151 as information on the horizontal display position and data of high-order four bits of the count value CNV of the vertical counter 152 as information on the vertical display position.

The panel driver 108 shifts the display position of the image by as much as −7 through +8 pixels horizontally as the high-order four bits of the count value CNH change from "0000" to "1111". Further, the panel driver 108 shifts the display position of the image by as much as −7 through +8 pixels vertically as the high-order four bits of the count value CNV change from "0000" to "1111". In this case, the display position of the image is shifted by as much as each of the pixels horizontally or vertically each time 8t elapses, where t is a cycle time of the clock signal SCK. That is, in this case, the above-described value T2 is 8t.

Further, the system controller 101 uses data of low-order three bits b3 to b1 of the count value CNH of the horizontal counter 151 as information on the horizontal phase change. In this case, if the image signal Va is a 480i or VGA signal, it uses only the high-order one bit b3 of these three bits b3 to b1. If b3="0", the system controller 101 leaves the phase of each of the horizontal interpolation positions at the time when the image signal Vb is obtained from the image signal Va unchanged as set to a reference phase (0°). If b3="1", it uniformly changes the phase of each of the interpolation positions by 360°/2. In this case, these phases of the interpolation positions are changed in change units of 360°/2=180° each time 4t elapses, where t is the cycle time of the clock signal SCK. That is, in this case, the above-described value T1 is 4t.

FIGS. 9A and 10A each show the relationship between a horizontal pixel position (which is indicated by "X" in the figures) of an image signal Va and a horizontal pixel position of an image signal Vb to be interpolated, that is, an interpolation position (which is indicated by "o" in the figures) when the image signal Va is a 480i signal and a VGA signal, respectively. However, the figures show only the interpolation positions in a condition where b3="0", that is, the reference phase (0°). If b3 changes to "1", the phase of each of the interpolation positions uniformly changes by 180° and the interpolation positions move to a location indicated by phase change information "1". If b3 returns to "0", the interpolation positions return to a shown location, that is, a location indicated by phase change information "0".

If the image signal Va is a 720i or SVGA signal, it uses only the high-order two bits b3 and b2 of the three bits b3 to b1. If b3b2="00", it leaves the phase of each of the horizontal interpolation positions at the time when the image signal Vb is obtained from the image signal Va unchanged as set to the reference phase (0°). If b3b2="01", it uniformly changes the phase of each of the interpolation positions by 360°/4. If b3b2="10", it uniformly changes the phase of each of the interpolation positions by 360°×2/4. If b3b2="11", it uniformly changes the phase of each of the interpolation positions by 360°×3/4. In this case, the phase of each of the interpolation positions is changed in change units of 360°/4=90° each time 2t elapses, where t is the cycle time of the clock signal SCK. That is, in this case, the above-described value T1 is 2t.

FIGS. 9B and 10B show a relationship between a horizontal pixel position (which is indicated by "X" in the figures) of an image signal Va and a horizontal pixel position of an image signal Vb to be interpolated, that is, an interpolation position (which is indicated by "o" in the figures) when the image signal Va is a 720i signal and an SVGA signal, respectively. However, the figures show only the interpolation positions in a condition where b3b2="00", that is, the reference phase (0°).

If b3b2 changes to "01", the phase of each of the interpolation positions uniformly changes by 90° and the interpolation positions move to a location indicated by phase change information "1". If b3b2 changes to "10", the interpolation positions uniformly change by another 90° and the interpolation positions move to a location indicated by phase change information "2". If b3b2 changes to "11", the interpolation positions uniformly change by another 90° and the interpolation positions move to a location indicated by phase change information "3". If b3b2 returns to "00", the interpolation positions return to a shown location, that is, a location indicated by phase change information "0".

If the image signal Va is a 1080i or XGA signal, it uses all of these three bits b3 to b1. If b3b2b1="000", it leaves the phase of each of the horizontal interpolation positions at the time when the image signal Vb is obtained from the image signal Va unchanged as set to the reference phase (0°).

If b3b2b1="001", it uniformly changes the phase of each of the interpolation positions by 360°/8. If b3b2b1="010", it uniformly changes the phase of each of the interpolation positions by 360°×2/8. If b3b2b1="011", it uniformly changes the phase of each of the interpolation positions by 360°×3/8. If b3b2b1 is "100", it uniformly changes the phase of each of the interpolation positions by 360°×4/8. If b3b2b1 is "101", it uniformly changes the phase of each of the interpolation positions by 360°×5/8. If b3b2b1 is "110", it uniformly changes the phase of each of the interpolation positions by 360°×6/8. If b3b2b1 is "111", it uniformly changes the phase of each of the interpolation positions by 360°×7/8. In this case, the phases of the interpolation positions are changed in change units of 360°/8=45° each time t elapses, where t is the cycle time of the clock signal SCK. That is, in this case, the above-described value T1 is t.

FIGS. 9C and 10C show the relationship between a horizontal pixel position (which is indicated by "X" in the figures) of an image signal Va and a horizontal pixel position of an image signal Vb to be interpolated, that is, an interpolation position (which is indicated by "o" in the figures) when the image signal Va is a 1080i signal and an SXGA signal, respectively. However, the figures show only the interpolation positions in a condition where b3b2b1="000", that is, the reference phase (0°).

If b3b2b1 changes to "001", the phase of each of the interpolation positions uniformly changes by 45° and the interpolation positions move to a location indicated by phase change information "1". If b3b2b1 changes to "010", the phase of each of the interpolation positions uniformly changes by another 45° and the interpolation positions move to a location indicated by phase change information "2". If b3b2b1 changes to "011", the phase of each of the interpolation positions uniformly changes by another 45° and the interpolation positions move to a location indicated by phase change information "3". If b3b2b1 changes to "100", the phase of each of the interpolation positions uniformly changes by another 45° and the interpolation positions move to a location indicated by phase change information "4".

If b3b2b1 changes to "101", the phase of each of the interpolation positions uniformly changes by another 45° and the interpolation positions move to a location indicated by phase change information "5". If b3b2b1 changes to "110", the phase of each of the interpolation positions uniformly changes by another 45° and the interpolation positions move to a location indicated by phase change information "6". If b3b2b1 changes to "111", the phase of each of the interpolation positions uniformly changes by another 45° and the interpolation positions move to a location indicated by phase change information "7". If b3b2b1 returns to "000", the interpolation positions return to a shown location, that is, a location indicated by phase change information "0".

Further, the system controller 101 uses data of low-order three bits b3 to b1 of the count value CNV of the vertical counter 152 as information on the vertical phase change. In this case, if the image signal Va is a 480i or VGA signal, it uses only the high-order one bit b3 of these three bits b3 to b1 to uniformly change, as in the case of the above-described horizontal phases, the phase of each of the interpolation positions in change units of 360°/2=180° each time 4t elapses, where t is the cycle time of the clock signal SCK.

If the image signal Va is a 720i or SVGA signal, it uses only the high-order two bits b3 and b2 of these three bits b3 to b1 to uniformly change, as in the case of the above-described horizontal phases, the phase of each of the interpolation positions in change units of 360°/4=90° each time 2t elapses, where t is the cycle time of the clock signal SCK. Further, if the image signal Va is a 1080i or XGA signal, it uses all of these three bits b3 to b1 to uniformly change, as in the case of the above-described horizontal phases, the phase of each of the interpolation positions in change units of 360°/8=45° each time t elapses, where t is the cycle time of the clock signal SCK.

The following will describe operations of the image display apparatus 100 shown in FIG. 1.

The input terminal 103 is supplied with the image signal $V_{TV}$ (480i, 720p, or 1080i signal) as a TV input from a tuner, not shown. The input terminal 104 is supplied with the image signal $V_{PC}$ (VGA, SGVA, or XGA signal) as a PC input from a personal computer, not shown.

The image signal $V_{TV}$ received by the input terminal 103 is supplied to the fixed terminal on the side of "a" of the transfer switch 105. The image signal $V_{PC}$ received by the input terminal 104 is supplied to the fixed terminal on the side of "b" of the transfer switch 105. This transfer switch 105 is transferred between the side "a" and the side "b" under control of the system controller 101 according to whether a TV input is selected or a PC input is selected through an operation of the remote-control transmitter 200 by the user.

If this transfer switch 105 is transferred to the side of "a", the image signal $V_{TV}$ is picked up as the image signal Va from this switch 105; if this transfer switch 105 is transferred to the side of "b", on the other hand, the image signal $V_{PC}$ is picked up. The image signal Va thus picked up by the transfer switch 105 is supplied to the number-of-pixels conversion section 106 and the input format detection section 107.

The input format detection section 107 detects, based on the horizontal frequency, etc. of the image signal Va, whether this image signal Va is a 480i signal, a 720p signal, a 1080i signal, a VGA signal, an SVGA signal, or an XGA signal. Format detection information FDI output from this format detection section 107 is supplied to the system controller 101.

The system controller 101, based on this format detection information FDI, acquires information on interpolation positions that correspond to the format of the image signal Va from, for example, the ROM table and supplies this information on interpolation position to the number-of-pixels conversion section 106.

Based on the information on interpolation position supplied from the system controller 101, pixel data located at the interpolation positions in the horizontal and vertical directions is generated using pixel data of the image signal Va and undergoes conversion of the number of pixels at the number-of-pixels conversion section 106, thereby obtaining the image signal Vb in which the number of pixels is converted. In this case, if the image signal Va is the image signal $V_{TV}$ as a TV input, an image signal having a resolution of 1040×784 dots is obtained as the image signal Vb; if the image signal Va is the image signal $V_{PC}$ as a PC input, an image signal having a resolution of 1008×752 dots is obtained as the image signal Vb.

The image signal Vb thus obtained at the number-of-pixels conversion section 106 is supplied to the panel driver 108. The panel driver 108 drives the PDP 109 according to the image signal Vb, thereby displaying an image due to the image signal Vb on the screen of the PDP 109.

As described above, the PDP 109 is compliant with the XGA standards and equipped with a display screen having 1024 (horizontal)×768 (vertical) pixels. Therefore, if the image signal Va is the image signal $V_{PC}$ as a PC input and the image signal Vb obtained at the number-of-pixels conversion section 106 has a resolution of 1008×752 dots, data of the 1008×752 pixels of the image signal Vb corresponds to the screen of the PDP 109 as indicated by a dotted line in FIG. 6A, so that an image due to the image signal Vb is displayed in a condition where it is under-scanned. In this case, the region where the pixel data does not exist is displayed in black.

Figure 6B:
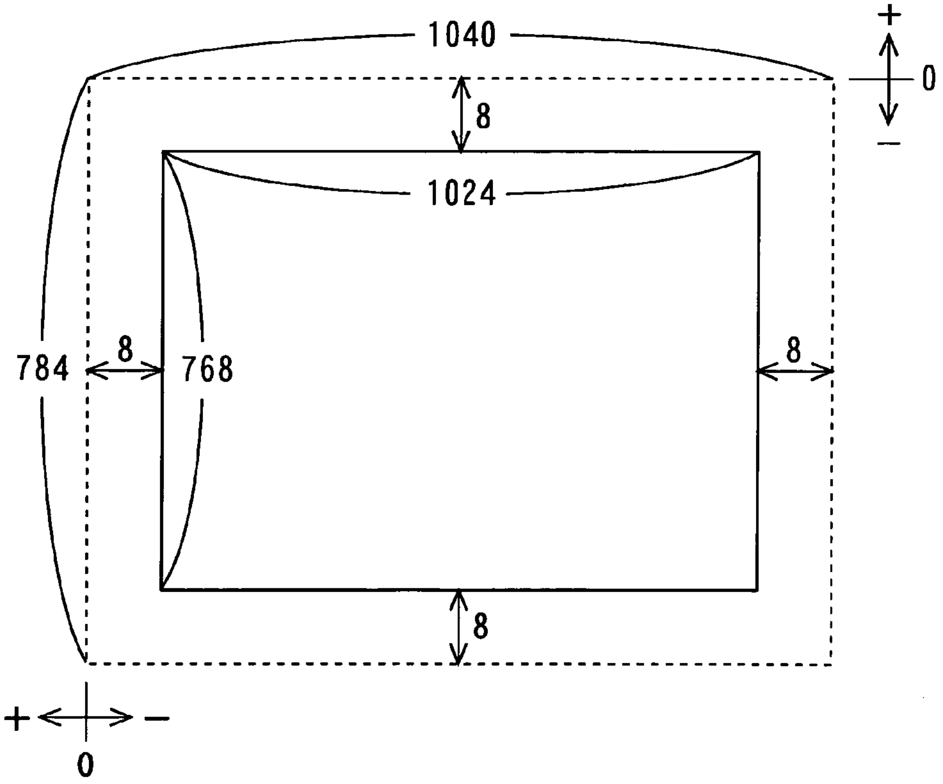

If the image signal Va is the image signal $V_{TV}$ as a TV input and the image signal Vb obtained at the number-of-pixels conversion section 106 has a resolution of 1040×784 dots, data of the 1040×784 pixels of the image signal Vb corresponds to the screen of the PDP 109 as indicated by a dotted line in FIG. 6B, so that an image due to the image signal Vb is displayed in a condition where it is over-scanned.

The following will describe operations for burn-in preventing processing for the purpose of preventing a screen from being burned-in. The system controller 101 supplies the panel driver 108 with information on horizontal and vertical display positions. Based on this information on display position, the panel driver 108 drives the PDP 109 in such a manner that the display position of an image displayed on the PDP 109 may be shifted by as much as one pixel in a range of −7 pixels through +8 pixels horizontally and vertically using the position of the broken lines of FIGS. 6A and 6B as the zero point.

In this case, high-order four bits of a count value CNH of the horizontal counter 151 (see FIG. 7) that transits as shown in FIG. 8A are used as the information on the horizontal display position. Further, high-order four bits of a count value CNV of the vertical counter 152 (see FIG. 7) that transits as shown in FIG. 8B are used as the information on the vertical display position.

If the count values CNH and CNV transit as shown in FIGS. 8A and 8B, respectively, in the first period TM1, the display position of the image is sequentially shifted by as much as −7 pixels through +8 pixels horizontally in a condition where it is shifted by −7 pixels vertically. In the following second period TM2, the image display position is sequentially shifted by as much as −7 pixels through +8 pixels vertically in a condition where it is shifted by +8 pixels horizontally. In the following third period TM3, the image display position is sequentially shifted by as much as +8 pixels through −7 pixels horizontally in a condition where it is shifted by +8 pixels vertically. In the following fourth period TM4, the image display position is sequentially shifted by as much as +8 pixels through −7 pixels vertically in a condition where it is shifted by −7 pixels horizontally.

Further, the system controller 101 uses low-order three bits of b3b2b1 of a count value CNH as information on the horizontal phase change and low-order three bits of b3b2b1 of a count value CNV as information on the vertical phase change, to utilize driving due to the panel driver 108 in such a manner that the phase of an interpolation position may be sequentially changed in change units of 360°/N during a lapse of time when the display position of an image shifts by as much as one pixel.

In this case, if the image signal Va is a 480i or VGA signal, N=2; if the image signal Va is a 720p or SVGA signal, N=4; and if the image signal Va is a 1080i or XGA signal, N=8. That is, the change unit is set to a smaller value as a conversion ratio m/n decreases, where n represents the number of pixels in a horizontal or vertical interpolation direction of the image signal Va and m represents the number of pixels in an interpolation direction of the image signal Vb.

In such a manner, the phase of an interpolation position is sequentially changed in units of 360°/N during a lapse of time when an image display position shifts by as much as one pixel, so that the distance by which the image displayed on the screen of the PDP 109 moves each time is 1/N of the inter-pixel spacing.

Figure 11A:
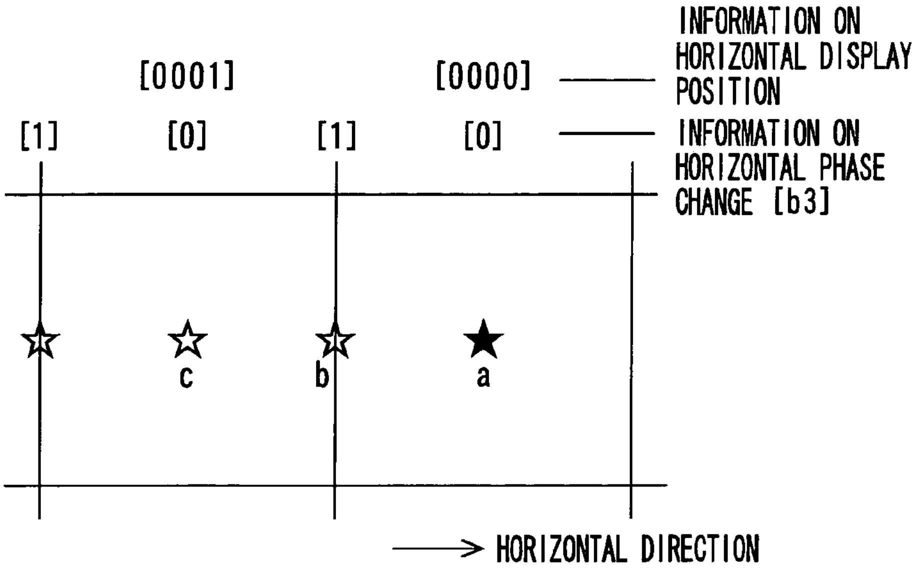
FIGS. 11A, 11B, and 11C are explanatory illustrations each for illustrating movement of an image.

FIG. 11A shows the horizontal movement of an image in a case where the image signal Va is a 480i or VGA signal. In this FIG. 11A, one square corresponds to one pixel of the PDP 109. This holds true also with FIGS. 11B and 11C.

If high-order four bits of the count value CNH are "0000" and bit b3 of its low-order three bits b3b2b1 is "0", the image display position is shifted by as much as −7 pixels and the interpolation position phase is the reference phase (0°). At this time, the image is in a condition where its target point is located at ★ (a).

In a lapse of time of 4t (where t is a cycle time of the clock signal SCK), the bit b3 of the count value CNH changes to "1", although its high-order four bits remain unchanged as set to "0000". In this case, the phase of each of the interpolation positions uniformly changes from the reference phase by as much as 180°. Therefore, the image moves in such a manner that its target point may be shifted from ★ (a) to ☆ (b) by as much as ½ of the inter-pixel spacing, although the image display position remains unchanged as shifted by as much as −7 pixels.

Further, in a lapse of time of 4t, the high-order four bits of the count value CNH change to "0001" and the bit b3 changes to "0". In this case, the phase of each of the interpolation positions returns to the reference phase, although the image display position is shifted leftward by as much as one pixel, that is, enters a state where it is shifted by as much as −6 pixels. Therefore, the image moves in such a manner that its target point may be shifted from ☆ (b) to ☆ (c) by as much as ½ of the inter-pixel spacing.

Subsequently, the above process is repeated, in which an image displayed on the PDP 109 moves in movement units of ½ of the inter-pixel spacing. Although not detailed, this holds true also with vertical movement, so that the image moves in movement units of ½ of the inter-pixel spacing.

Figure 11B:
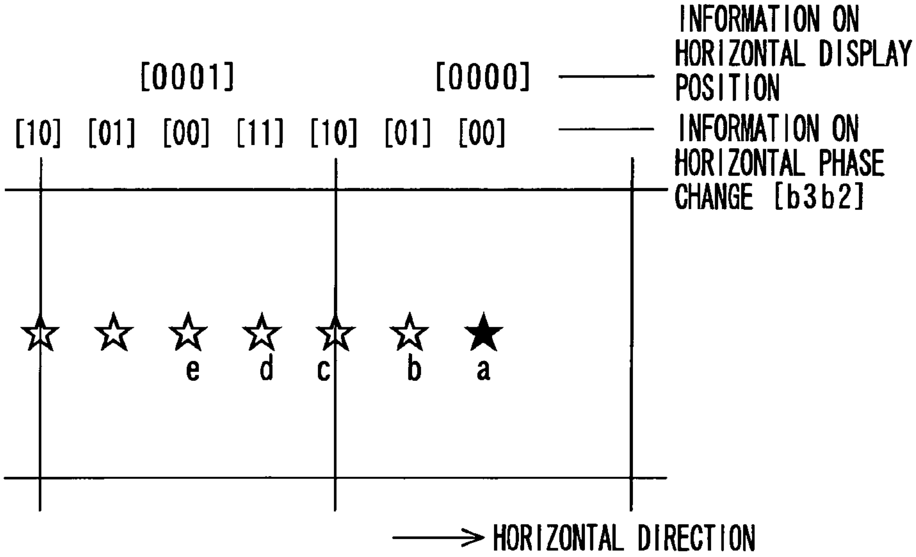

FIG. 11B shows horizontal movement of an image in a case where the image signal Va is a 720i or SVGA signal.

If the high-order four bits of the count value CNH are "0000" and the bit b3b2 of its low-order three bits b3b2b1 are "00", the image display position is shifted by as much as −7 pixels and the interpolation position phase is the reference phase (0°). At this time, the image is in a condition where its target point is located at ★ (a).

In a lapse of time of 2t (where t is the cycle time of the clock signal SCK), the bit b3b2 of the count value CNH change to "01", although its high-order four bits remain unchanged as set to "0000". In this case, the phase of each of the interpolation positions uniformly changes from the reference phase by as much as −90°. Therefore, the image moves in such a manner that its target point may be shifted from ★ (a) to ☆ (b) by as much as ¼ of the inter-pixel spacing, although the image display position remains unchanged as shifted by as much as −7 pixels.

Further, in a lapse of time of 2t, the bits b3b2 of the count value CNH change to "10", although its high-order four bits remain unchanged as set to "0000". In this case, the phase of each of the interpolation positions uniformly changes by 180° from the reference phase. Therefore, the image moves in such a manner that its target point may be shifted from ☆ (b) to ☆ (c) by as much as ¼ of the inter-pixel spacing, although the image display position remains unchanged as shifted by as much as −7 pixels.

In another lapse of time of 2t, the bits b3b2 of the count value CNH change to "11", although its high-order four bits remain unchanged as set to "0000". In this case, the phase of each of the interpolation positions uniformly changes by 270°. Therefore, the image moves in such a manner that its target point may be shifted from ☆ (c) to ☆ (d) by as much as ¼ of the inter-pixel spacing, although the image display position remains unchanged as shifted by as much as −7 pixels.

In a further lapse of time of 2t, the high-order four bits of the count value CNH change to "0001" and its bits b3b2 change to "00". In this case, the phase of each of the interpolation positions returns to the reference phase; however, the image display position is shifted leftward by as much as one pixel, so that its display position can enter into a state where it is shifted by as much as −6 pixels. Therefore, the image moves in such a manner that its target point may be shifted from ☆ (d) to ☆ (e) by as much as ¼ of the inter-pixel spacing.

Subsequently, the above process is repeated, in which an image displayed on the PDP 109 moves in movement units of ¼ of the inter-pixel spacing. Although not detailed, this holds true also with vertical movement, so that the image moves in movement units of ¼ of the inter-pixel spacing.

Figure 11C:
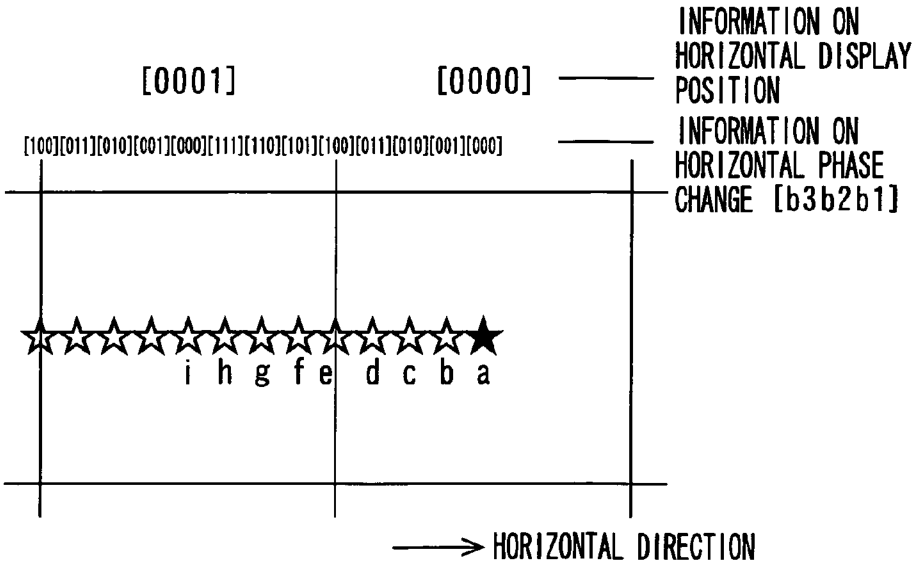

FIG. 11C shows horizontal movement of an image in a case where the image signal Va is a 1080i or XGA signal.

If the high-order four bits of the count value CNH are "0000" and its low-order three bits b3b2b1 are "000", the image display position is shifted by as much as −7 pixels and the interpolation position phase is the reference phase (0°). At this time, the image is in a condition where its target point is located at ★ (a).

In a lapse of time of t (where t is the cycle time of the clock signal SCK), the bits b3b2b1 of the count value CNH change to "001", although its high-order four bits remain unchanged as set to "0000". In this case, the phase of each of the interpolation positions uniformly changes from the reference phase by as much as 45°. Therefore, the image moves in such a manner that its target point may be shifted from ★ (a) to ☆ (b) by as much as ⅛ of the inter-pixel spacing, although the image display position remains unchanged as shifted by as much as −7 pixels.

Further, in a lapse of time of t, the bits b3b2b1 of the count value CNH change to "010", although its high-order four bits remain unchanged as set to "0000". In this case, the phase of each of the interpolation positions uniformly changes by 90° from the reference phase. Therefore, the image moves in such a manner that its target point may be shifted from ☆ (b) to ☆ (c) by as much as ⅛ of the inter-pixel spacing, although the image display position remains unchanged as shifted by as much as −7 pixels.

Further, in a lapse of time of t, the bits b3b2b1 of the count value CNH change to "011", although its high-order four bits remain unchanged as set to "0000". In this case, the phase of each of the interpolation positions uniformly changes by 135°. Therefore, the image moves in such a manner that its target point may be shifted from ☆ (c) to ☆ (d) by as much as ⅛ of the inter-pixel spacing, although the image display position remains unchanged as shifted by as much as −7 pixels.

Further, in a lapse of time of t, the bits b3b2b1 of the count value CNH change to "100", although its high-order four bits remain unchanged as set to "0000". In this case, the phase of each of the interpolation positions uniformly changes by 180°. Therefore, the image moves in such a manner that its target point may be shifted from ☆ (d) to ☆ (e) by as much as ⅛ of the inter-pixel spacing, although the image display position remains unchanged as shifted by as much as −7 pixels.

Further, in a lapse of time of t, the bits b3b2b1 of the count value CNH change to "101", although its high-order four bits remain unchanged as set to "0000". In this case, the phase of each of the interpolation positions uniformly changes by 225°. Therefore, the image moves in such a manner that its target point may be shifted from ☆ (e) to ☆ (f) by as much as ⅛ of the inter-pixel spacing, although the image display position remains unchanged as shifted by as much as −7 pixels.

Further, in a lapse of time of t, the bits b3b2b1 of the count value CNH change to "110", although its high-order four bits remain unchanged as set to "0000". In this case, the phase of each of the interpolation positions uniformly changes by 270°. Therefore, the image moves in such a manner that its target point may be shifted from ☆ (f) to ☆ (g) by as much as ⅛ of the inter-pixel spacing, although the image display position remains unchanged as shifted by as much as −7 pixels.

Further, in a lapse of time of t, the bits b3b2b1 of the count value CNH change to "111", although its high-order four bits remain unchanged as set to "0000". In this case, the phase of each of the interpolation positions uniformly changes by 315°. Therefore, the image moves in such a manner that its target point may be shifted from ☆ (g) to ☆ (h) by as much as ⅛ of the inter-pixel spacing, although the image display position remains unchanged as shifted by as much as −7 pixels.

Further, in a lapse of time of t, the high-order four bits of the count value CNH change to "0001" and its bits b3b2b1 change to "000". In this case, the phase of each of the interpolation positions returns to the reference phase; however, the image display position is shifted leftward by as much as one pixel, so that the image display position can enter into a state where it is shifted by as much as −6 pixels. Therefore, the image moves in such a manner that its target point may be shifted from ☆ (h) to ☆ (i) by as much as ⅛ of the inter-pixel spacing.

Subsequently, the above process is repeated, in which an image displayed on the PDP 109 moves in movement units of ⅛ of the inter-pixel spacing. Although not detailed, this holds true also with vertical movement, so that the image moves in movement units of ⅛ of the inter-pixel spacing.

As described above, in the present embodiment, an image displayed on the PDP 109 moves each time 4t, 2t, or t elapses (where t is a cycle time of the clock signal SCK), thereby preventing the screen from being burned-in. In this case, the distance over which the image moves horizontally or vertically each time is, for example, ½, ¼, or ⅛ of the inter-pixel spacing, which is smaller than the inter-pixel spacing. Therefore, the conspicuous unpleasantness due to the image movement for the purpose of prevention of burn-in on the screen is mitigated.

Further, the change unit for the phase of the interpolation position is set to a smaller value as the conversion ratio m/n decreases, where n represents the number of pixels in a horizontal or vertical interpolation direction of the image signal Va and m represents the number of pixels in an interpolation direction of the image signal Vb. That is, the smaller this conversion ratio m/n is, the less the image moves horizontally or vertically each time. Therefore, although generally, the smaller the conversion ratio m/n is, the more conspicuous the movement of an image becomes, by reducing the change unit for the phase of the interpolation position as described above, it is possible to make the image movement less unpleasant visually even when the conversion ratio is small.

Although, in the above embodiment, the count value CNH of the horizontal counter 151 and the count value CNV of the vertical counter 152 have transited as shown in FIGS. 8A and 8B, respectively, and the image display position of an image displayed on the PDP 109 has moved, from right to left, bottom to top, left to right, and then top to bottom repeatedly, the pattern of movement of the image display position is not limited to this. By changing the transition of the count values CNH and CNV, a variety of movement patterns can be realized.

Although, in the above embodiment, the phase of each of the interpolation positions has been changed in change units of 360°/2, 360°/4, and 360°/8 (where the inter-interpolation position is assumed to be 360°), the change unit is not limited to these values. In short, by changing the phase of each of the interpolation positions in a change unit less than 360°, it is possible to make a horizontal or vertical distance over which the image moves each time smaller than the inter-pixel spacing, thereby allowing mitigation of the conspicuous unpleasantness due to the image movement for the purpose of prevention of burn-in on the screen.

Further, in the above embodiment, the format of the image signal Va picked up by the transfer switch 105 has been detected by the input format detection section 107, to supply format detection information FDI to the system controller 101. However, alternatively, the information on the format of the image signal Va may be given to the system controller 101 through the operation of the remote-control transmitter 200 by the user.

Further, although the resolution of the image signal Vb and the movement range of an image displayed on the PDP 109 have each been given in one example in the above embodiment, the present invention is not limited thereto. Although the above embodiment has exemplified the display device as the PDP 109, of course the present invention is similarly applicable to an image display apparatus using any other display devices subject to burn-in, for example, a liquid crystal display (LCD).

Further, the above embodiment has given examples where the image signal $V_{PC}$ as a PC input is the VGA signal, the SVGA signal, and the XGA signal, in which the image signal $V_{PC}$ is converted into the image signal Vb having a different number of pixels therefrom.

However, such a case may be thought of that an image signal $V_{PC}$ matching the resolution of the PDP 109 is input as the image signal Va to the number-of-pixels conversion section 106. In this case, the number-of-pixels conversion section 106 need not increase or decrease the number of pixels, so that the number of pixels of the image signal Vb output from this number-of-pixels conversion section 106 is made the same as that of the image signal Va as an input.

In this case, so-called real display is performed on the PDP 109. In a case where real display is thus performed, if the phase of each interpolation position in the number-of-pixels conversion section 106 is changed with respect to the reference phase (0°) through control for burn-in preventing processing as described above, deterioration such as blurring may occur in the image.

To solve this problem, in the case where the number of the pixels of the image signal Vb output from the number-of-pixels conversion section 106 is assumed to be the same as that of the image signal Va and so-called real display is performed on the PDP 109, the phase of each interpolation position could be the same as the reference phase instead of changing the phase of each interpolation position in the number-of-pixels conversion section 106 with respect to the reference phase through control for burn-in preventing processing. This allows for preventing deterioration such as blurring from occurring in the image.

In this case, however, control for prevention of burn-in on the screen is conducted only by causing the panel driver 108 to sequentially move the image display position by as much as one pixel horizontally and vertically.

According to the present invention, pixel data located at interpolation positions at least in a horizontal or vertical interpolation direction is generated based on pixel data contained in the input image signal to obtain an output image signal in which the number of pixels in the interpolation direction is converted, whereby the phase of each of the interpolation positions is uniformly changed in a change unit smaller than 360° each time a predetermined period of time elapses on the assumption that the interval between the interpolation positions is 360°, so that it is possible to mitigate the conspicuous unpleasantness due to the image movement for the purpose of prevention of burn-in on the screen.

Further, according to the present invention, the change unit for the phase of the interpolation position is set to a smaller value as the conversion ratio m/n decreases, where n is the number of pixels of an input image signal in the interpolation direction and m is the number of pixels of an output image signal in the interpolation direction, so that if movement of an image is conspicuous because the conversion ratio m/n is small, the distance over which the image moves each time can be reduced to mitigate the conspicuous unpleasantness due to the image movement.

As described above, the image processing apparatus, etc. related to the present invention can make it possible to mitigate the conspicuous unpleasantness due to the image movement for the purpose of prevention of burn-in on the screen and prevent burn-in on a display device, such as, for example, a PDP and an LCD, from occurring.

The invention claimed is:

1. An apparatus for processing an image signal and for converting a number of pixels of an input image signal to a number of pixels of an output image signal, said apparatus comprising:

number-of-pixels conversion means for generating pixel data located at interpolation positions at least in a horizontal or a vertical interpolation direction based on pixel data contained in the input image signal to obtain the output image signal in which the number of pixels in the interpolation direction is converted; and interpolation phase control means for changing a phase of each of the interpolation positions in the number-of-pixels conversion means uniformly across all the pixels in a change unit smaller than an interval between adjacent interpolation positions each time a first period of time elapses, such that the phase of each of the interpolation positions is changed by a change unit equal to an interval between adjacent interpolation positions each time a second period of time elapses.

2. The apparatus for processing an image signal according to claim 1, wherein when a display position of an image formed from the output image signal is shifted by as much as one pixel in the interpolation direction each time a second period of time elapses, the first period of time is set to 1/N of the second period of time, where N is an integer>1, and the change unit is set to 1/N of the interval between adjacent interpolation positions.

3. The apparatus for processing an image signal according to claim 1, wherein the smaller a conversion ratio m/n in the number-of-pixels conversion means is, the smaller the change unit is made, where n is the number of pixels of the input image signal in the interpolation direction, m is the number of pixels of the output image signal in the interpolation direction, and m/n is the conversion ratio.

4. The apparatus for processing an image signal according to claim 1, further comprising:

input format detection means for detecting a format of the input image signal; and information acquisition means for acquiring information on the interpolation positions and information on the change unit.

5. The apparatus for processing an image signal according to claim 1, wherein if the output image signal has the same number of pixels as the input image signal, the interpolation phase control means stops changing the phases of the interpolation positions in the number-of-pixels conversion means.

6. A method for processing an image signal and for converting a number of pixels of an input image signal to a number of pixels of an output image signal, said method comprising:

generating pixel data located at interpolation positions at least in a horizontal or a vertical interpolation direction based on pixel data contained in the input image signal to obtain the output image signal in which the number of pixels in the interpolation direction is converted; and changing a phase of each of the interpolation positions uniformly across all the pixels in a change unit smaller than an interval between adjacent interpolation positions each time a first period of time elapses, such that the phase of each of the interpolation positions is changed by a change unit equal to an interval between adjacent interpolation positions each time a second period of time elapses.

7. The method for processing an image signal according to claim 6, wherein when a display position of an image formed from the output image signal is shifted by as much as one pixel in the interpolation direction each time a second period of time elapses, the first period of time is set to 1/N of the second period of time, where N is an integer>1, and the change unit is set to 1/N of the interval between adjacent interpolation positions.

8. An image display apparatus, comprising:

number-of-pixels conversion means for generating pixel data located at interpolation positions at least in a horizontal or a vertical interpolation direction based on pixel data contained in an input image signal to obtain an output image signal in which the number of pixels in the interpolation direction is converted;

a display device for displaying an image formed from the output image signal obtained at the number-of-pixels conversion means;

display position control means for shifting a display position of the image displayed on the display device by as much as one pixel in the interpolation direction each time a second period of time elapses; and interpolation phase control means for changing a phase of each of the interpolation positions in the number-of-pixels conversion means uniformly across all the pixels in a change unit smaller than an interval between adjacent interpolation positions each time a first period of time smaller than the second period of time elapses, such that the phase of each of the interpolation positions is changed by a change unit equal to an interval between adjacent interpolation positions each time a second period of time elapses.

9. The image display apparatus according to claim 8, wherein the first period of time is set to 1/N of the second period of time, where N is an integer>1, and the change unit is set to 1/N of the interval between adjacent interpolation positions.

* * * * *